(12) United States Patent
Avison-Fell et al.

(10) Patent No.: US 10,496,177 B2
(45) Date of Patent: Dec. 3, 2019

(54) SIMULATED TOUCH INPUT

(71) Applicant: DISH Technologies L.L.C., Englewood, CO (US)

(72) Inventors: Craig Avison-Fell, Settle (GB); David Harris, Keighley (GB); Mark Nolan, Keighley (GB)

(73) Assignee: DISH Technologies L.L.C., Englewood, CO (US)

( * ) Notice: Subject to any disclaimer, the term of this patent is extended or adjusted under 35 U.S.C. 154(b) by 412 days.

(21) Appl. No.: 13/764,554

(22) Filed: Feb. 11, 2013

(65) Prior Publication Data

US 2014/0225836 A1 Aug. 14, 2014

(51) Int. Cl.
| | |
|---|---|
| *G06F 3/041* | (2006.01) |
| *G06F 3/01* | (2006.01) |
| *G06F 3/038* | (2013.01) |
| *G06F 3/0346* | (2013.01) |
| *H04N 21/422* | (2011.01) |
| *G06F 3/0481* | (2013.01) |
| *H04N 5/44* | (2011.01) |

(52) U.S. Cl.
CPC .............. *G06F 3/017* (2013.01); *G06F 3/038* (2013.01); *G06F 3/0346* (2013.01); *G06F 3/0481* (2013.01); *H04N 21/42222* (2013.01); *H04N 21/42224* (2013.01); *G06F 2203/04806* (2013.01); *H04N 5/4403* (2013.01)

(58) Field of Classification Search
CPC ......... G06F 3/017; G06F 3/038; G06F 3/0346
See application file for complete search history.

(56) References Cited

U.S. PATENT DOCUMENTS

| | | | |
|---|---|---|---|
| 2005/0212756 A1 | 9/2005 | Marvit et al. | |
| 2009/0066647 A1* | 3/2009 | Kerr | G06F 3/0346 345/158 |
| 2010/0238137 A1* | 9/2010 | Han et al. | 345/175 |
| 2011/0071789 A1* | 3/2011 | Han | G06F 3/0346 702/141 |
| 2012/0200497 A1 | 8/2012 | Nasiri et al. | |
| 2012/0256835 A1 | 10/2012 | Musick et al. | |
| 2012/0320198 A1* | 12/2012 | Yasutake | 348/143 |
| 2013/0141429 A1* | 6/2013 | Sakakibara | G06F 3/0346 345/419 |
| 2014/0092011 A1* | 4/2014 | De Foras et al. | 345/157 |

FOREIGN PATENT DOCUMENTS

WO 2013/104570 A1 7/2013

OTHER PUBLICATIONS

Extended European Search Report for EP 14154505.3 dated Oct. 4, 2016, all pages.
Office Action for EP 14154505.3 dated Jul. 26, 2019, all pages.

* cited by examiner

*Primary Examiner* — Kent W Chang
*Assistant Examiner* — Andrew Lee

(57) ABSTRACT

Systems and methods for switching a user interface input response mode. A direction of motion of a pointing device with reference to a spatial coordinate system may be determined. The direction of motion may be associated with a particular touch input for simulation by the computer system based on motion of the pointing device, the particular touch input selected from multiple touch inputs. The user interface input response mode may be switched from a first mode to a second mode associated with the particular touch input.

20 Claims, 7 Drawing Sheets

SIMULATED TOUCH INPUT

BACKGROUND

Multi-touch input or gesturing may refer to the ability of an electronic device to detect and perform a specific function based on input made by two or more points of contact with a touch-sensitive surface. An example of a multi-touch input includes a "pinch to zoom" gesture, where two fingers may be placed on a touch surface to zoom in/out of a particular screen image (e.g., photo, web page, etc.) by a pinching/spreading motion. Multi-touch gesturing is however typically unavailable in scenarios where a particular device does not include or incorporate a touch sensitive surface.

SUMMARY

This Summary does not in any way limit the scope of the claimed subject matter.

In an aspect, a method for switching a user interface input response mode is disclosed. The method may include determining a direction of motion of a pointing device with reference to a spatial coordinate system. The method may further include associating the direction of motion with a particular touch input for simulation by the computer system based on motion of the pointing device, the particular touch input selected from a plurality of touch inputs. The method may further include switching the user interface input response mode from a first mode to a second mode associated with the particular touch input.

In an aspect, a television receiver is disclosed. The television receiver may be configured to receive from a pointing device a first signal that activates a simulated touch input mode. The television receiver may further be configured to receive from the pointing device a second signal that indicates a direction of motion of the pointing device in reference to a volumetric coordinate system. The television receiver may further be configured to map the direction of motion of the pointing device to a particular simulated touch gesture selected from a plurality of simulated touch gestures. The television receiver may further be configured to select the particular simulated touch gesture to control display of an image on a display device using the pointing device.

In an aspect, A computing device including a processing unit and a system memory connected to the processing unit is disclosed. The system memory may include instructions that, when executed by the processing unit, cause the processing unit to implement at least one module to switch a user interface input response mode. The at least one module may be configured to determine a direction of motion of a pointing device with reference to a spatial coordinate system. The at least one module may further be configured to associate the direction of motion with a particular touch input for simulation by the computer system based on motion of the pointing device, the particular touch input selected from a plurality of touch inputs. The at least one module may further be configured to switch the user interface input response mode from a first mode to a second mode that is associated with the particular touch input.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. When only the first reference label is used in the specification, the description is applicable to any one of the similar components having the same first reference label irrespective of the second reference label.

DETAILED DESCRIPTION

Figure 1:
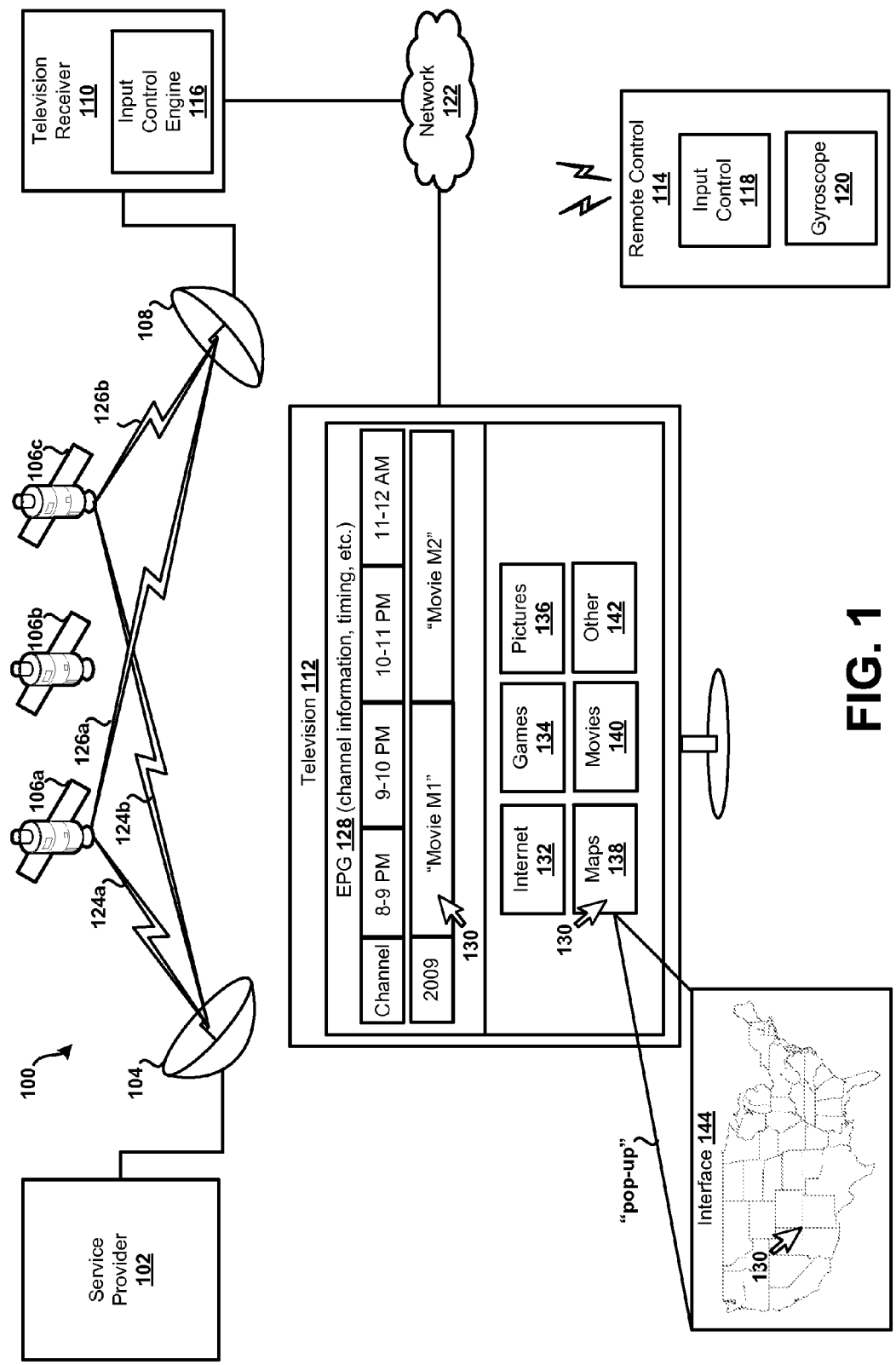
FIG. 1 shows an example media content distribution system in which aspects of the present disclosure may be implemented.

FIG. 1 shows an example media content distribution system 100 in which aspects of the present disclosure may be implemented. For brevity, the system 100 is depicted in a simplified and conceptual form, and may generally include more or fewer systems, devices, networks, and/or other components as desired. Further, number and type of features or elements incorporated within the system 100 may or may not be implementation specific, and at least some of the aspects of the system 100 may be similar to a cable television distribution system, or other type of media or content distribution system. Further, the "television receiver" as described throughout may be any type of television receiver, such as a set-top-box for example. In another example, the "television receiver" may correspond to functionality integrated into a television, a digital video recorder, a tablet, or any other computing system or device, and variations thereof. Additionally, features and concepts as discussed throughout the present disclosure may be applicable to any type or form of networked computing system environment, and may not be limited to a satellite television system implementation, a cable television system implementation, or other particular implementation.

The example system 100 may include a service provider 102, a satellite uplink 104, a plurality of orbiting (e.g., geosynchronous) satellites 106(*a-c*), a satellite dish 108, a television receiver 110, a television 112, and a pointing device 114. In the present example, the television receiver 110 may at least include an ICE (Input Control Engine) 116, and the pointing device 114 may at least include an input control 118 and a gyroscope 120. As discussed in further detail below, the ICE 116, together with the input control 118 and the gyroscope 120, may be configured to enable a user to implement a touch or multi-touch input using the pointing device 114, without the requirement of the television 112 having a touch-sensitive surface.

The system 100 may also include at least one network 122 that establishes a bi-directional communication path for data transfer between the television receiver 110 and the television 112. In some embodiments, the network 122 may further establish a bi-directional communication path for data transfer between the television receiver 110 and the service provider 102 (not shown). In general, the network 122 may incorporate or exhibit any number of terrestrial and/or non-terrestrial network features or elements. For example, the network 122 may incorporate or exhibit any number of features or elements of various wireless and/or hardwired packet-based communication networks such as, for example, a WAN (Wide Area Network) network, a HAN (Home Area Network) network, a LAN (Local Area Network) network, a WLAN (Wireless Local Area Network) network, the Internet, or other any type of communication network(s) configured such that data may be transferred among respective elements of the example system 100.

The television receiver 110, together with the television 112 and the network 122, may form at least a portion of a particular home computing network, and may each be respectively configured such as to enable communication(s) in accordance with any particular communication protocol(s) and/or standard(s) including, for example, TCP/IP (Transmission Control Protocol/Internet Protocol), DLNA/DTCP-IP (Digital Living Network Alliance/Digital Transmission Copy Protection over Internet Protocol), HDMI/HDCP (High-Definition Multimedia Interface/High-bandwidth Digital Content Protection), and others.

In practice, the satellites 106 may be configured to receive uplink signals 124(*a-b*) from the satellite uplink 104. In this example, the uplink signals 124 may contain one or more transponder streams of particular data or content (e.g., a particular television channel) that is supplied by the service provider 102. For example, each of the respective uplink signals 124 may contain various encoded HD (High Definition) television channels, various SD (Standard Definition) television channels, on-demand programming, programming information, and/or any other content in the form of at least one transponder stream and in accordance with an allotted carrier frequency and bandwidth. In this example, different television channels may be carried using different ones of the satellites 106. Different television channels may also be carried using different transponders of a particular satellite (e.g., satellite 106*a*); thus, such television channels may be transmitted at different frequencies and/or different frequency ranges. For example, a first and second television channel may be carried on a first carrier frequency over a first transponder of satellite 106*a*, and a third, fourth, and fifth television channel may be carried on second carrier frequency over a first transponder of satellite 106*b*, or, the third, fourth, and fifth television channel may be carried on a second carrier frequency over a second transponder of satellite 106*a*, etc.

The satellites 106 may further be configured to relay the uplink signals 124 to the satellite dish 108 as downlink signals 126(*a-b*). Similar to the uplink signals 124, each of the downlink signals 126(*a-b*) may contain one or more transponder streams of particular data or content, such as various encoded and/or electronically scrambled television channels, on-demand programming, etc., in accordance with an allotted carrier frequency and bandwidth. The downlink signals 126, however, may not necessarily contain the same content as a corresponding one of the uplink signals 124. For example, the uplink signal 124*a* may include a first transponder stream containing at least a first group of television channels, and the downlink signal 126*a* may include a second transponder stream containing at least a second, different group of television channels. In other examples, the first and second group of television channels may have one or more television channels in common. In sum, there may be varying degrees of correlation between the uplink signals 124 and the downlink signals 126, both in terms of content and underlying characteristics.

Continuing with the present example implementation scenario, the satellite dish 108 may be provided for use (e.g., on a subscription basis) to receive television channels provided by the service provider 102, satellite uplink 104, and/or satellites 106. For example, the satellite dish 108 may be configured to receive particular transponder streams, or downlink signals (e.g., downlink signals 126), from the satellites 106. Additionally, the television receiver 110, which is communicatively coupled to the satellite dish 108, may subsequently select via tuner (not shown), for example, and relay particular transponder streams to the television 112 for display thereon as desired. For example, the satellite dish 108 and the television receiver 110 may, respectively, be configured to receive and relay at least one premium HD-formatted television channel to the television 112. In this example, the premium HD channel may be output to the television 112 from the television receiver 110 in accordance with the HDMI/HDCP content protection technologies.

In example embodiments, the television receiver 110 may be configured to output a plurality of interfaces to the television 112. For example, as shown in FIG. 1, the television receiver 110 may be configured to output an EPG (Electronic Programming Guide) 128 to the television 112. The EPG 128 may at least present various information related to television channels and the timing of programs or programming appearing on such television channels (e.g., as received from satellites 106). For example, the EPG 128 may at least display channel information associated with a channel "2009," where a "Movie M1" is listed as scheduled to appear on the channel "2009" during a particular time period "8-10 PM" of a particular day, etc. In this example, and assuming that a "current" time is sometime during the particular time period "8-10 PM," a user may manipulate a cursor 130 using the pointing device 114 to select (e.g., via "point and click") the "Movie M1" for viewing on the television 112.

The television receiver 110 may further be configured to output a plurality of application icons to the television 112. In general, number and type of application icons output by the television receiver 110 to the television 112 may vary, and may or may not be implementation specific. As shown in FIG. 1, however, the television receiver 110 may be configured to output at least an Internet icon 132, a Games icon 134, a Pictures icon 136, a Maps icon 138, a Movies icon 140, and an Other icon 142. In this example, the Other icon 142 is intended to represent "other" types of application icons not expressly shown in FIG. 1.

In general, a particular application icon when selected may open a corresponding application, or a folder containing corresponding application data, for interaction and/or viewing by a user. For example, a user may manipulate the cursor 130 using the pointing device 114 to select the Maps icon 138 for immediate viewing of a particular "map" or "map-related" interface 144 on the television 112. In this example, the user may wish to interact with a "map" or "map-related" image as displayed on, within, or by the interface 144. For example, as shown in FIG. 1, a user may manipulate the cursor 130 using the pointing device 114 to interact with an image of the contiguous United States displayed within the interface 144.

In practice, this interaction may entail one or more discrete "point and click" actions consistent with a "single-point" input response mode such as, for example, selection of a particular button or command to "zoom-in" to the image of the contiguous United States. Such a discrete "point and click" action however may provide an "incomplete" or "lacking" user experience, because the discrete "point and click" actions may be insufficient to enable a user to experience more sophisticated interactions with the interface 144. In accordance with the principles of the present disclosure, the ICE 116 may be configured to address these and other issues that may be encountered with interacting with features or functionality associated with any one of the respective icons 132, 134, 136, 138, 140, and 142.

Figure 2:
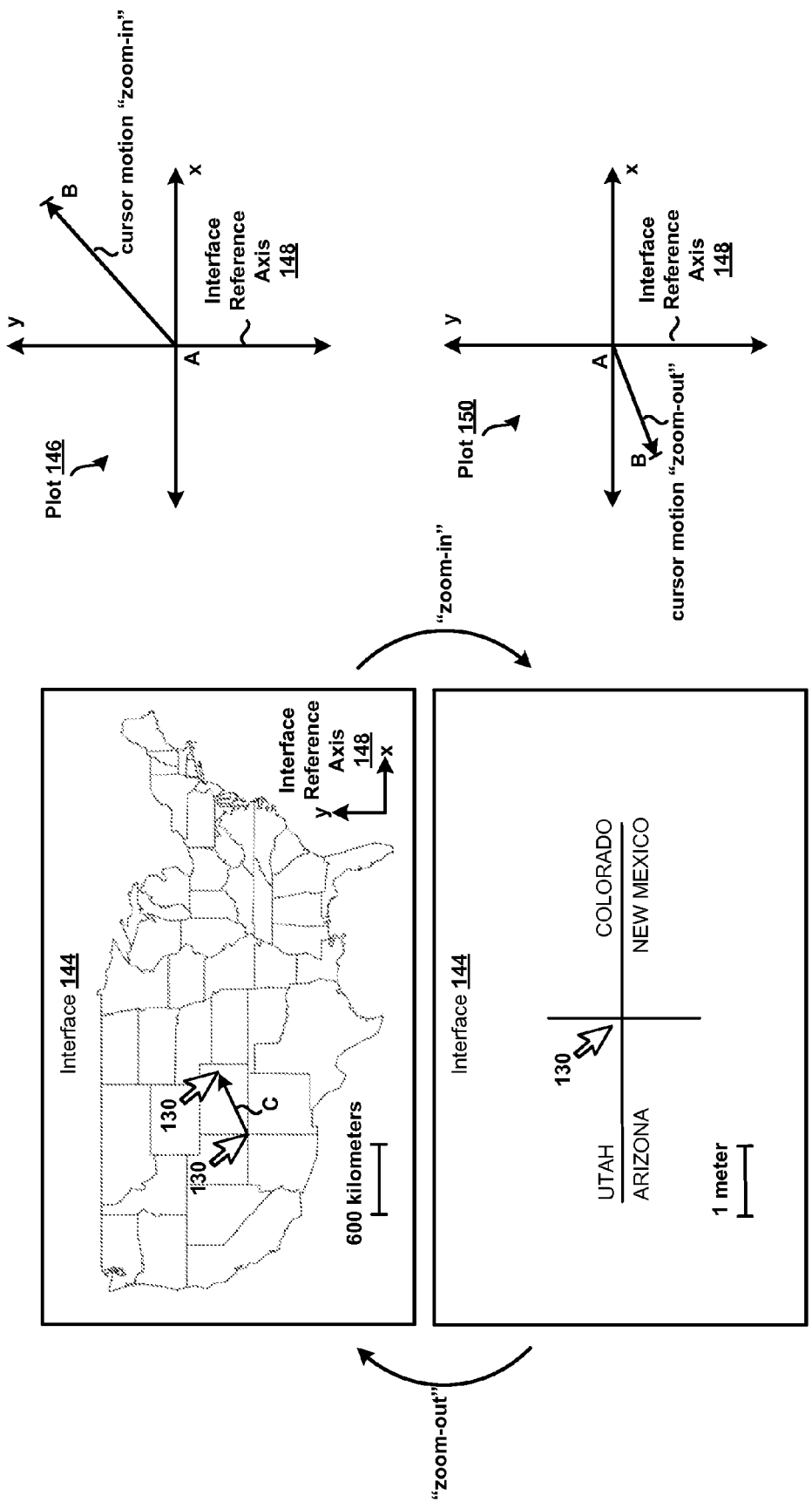
FIG. 2 shows an example simulated multi-touch input.

For example, referring now additionally to FIG. 2, a simulated multi-touch input is shown in accordance with the present disclosure. In particular, FIG. 2 shows a simulated multi-touch "pinch to zoom" from the perspective of movement of the cursor 130 within the interface 144 of FIG. 1. Such an implementation is consistent with a "simulated" input response mode in accordance with the present disclosure, and is distinguished from the above-mentioned "single-point" input response mode in many respects. For example, the "simulated" input response mode may enable a user to implement a touch or multi-touch input using the pointing device 114, without the requirement of the television 112 having a touch-sensitive surface. The user may thus experience a more convenient, sophisticated, complete, and/or satisfying interaction with the interface 144.

For example, a simulated multi-touch "pinch to zoom" input may be considered more "fluid" and/or more "sophisticated" when compared to a "zoom" function implemented by discrete "point and click" actions. For example, in order to "zoom-in" to a particular geographical point of interest within the interface 144 via discrete "point and click" actions, a user may be required to perform multiple "click" actions, interspersed with multiple "drag" actions to perfect a "zoom-in" to an intended feature. In contrast, and as described in further detail below, in order to "zoom-in" to a particular geographical point of interest within the interface 144 via a simulated multi-touch "pinch to zoom-in" input, a user more may perform a single "click" action to engage the simulated multi-touch "pinch to zoom-in" input, and then perform a "fluid" or "continuous" movement with the pointing device 114 to perfect a "zoom-in" to an intended feature. Such an implementation may at least be perceived to be a less time consuming, and a more user-friendly and satisfying experience in interacting with the interface 144.

Other benefits and/or advantages associated with the simulation of a touch or multi-touch input using the pointing device 114 of FIG. 1 may be understood from the preceding description provided in connection with FIGS. 1-2, and from the following description provided in connection with FIGS. 3-7.

For example, referring still to FIGS. 1-2, a user may initially manipulate the cursor 130 using the pointing device 114 to identify or locate a particular geographical point of interest within the interface 144. For example, as a first step, a user may manipulate the cursor 130 using the pointing device 114 to roughly identify or locate the intersection of Utah, Colorado, Arizona, and New Mexico within the contiguous United States, a unique political geographic feature commonly known as the "Four Corners" landmark. Subsequently, to initiate a simulated "pinch to zoom-in" input, the user may actuate the input control 118 of the pointing device 114 (see FIG. 1) to engage the ICE 116 of the television receiver 110. In one embodiment, the input control 118 may comprise of a depressible button incorporated within or on the pointing device 114. Other embodiments are however possible. For example, it is contemplated that the input control 118 may be configured to support any type of HMI (Human-Machine Interaction) to engage the ICE 116 of the television receiver 110. One example of such an implementation may include VIC (Voice Input Control).

Continuing with the above-mentioned example of a simulated multi-touch "pinch to zoom-in" input, following initial actuation of the input control 118 of the pointing device 114, the user may move the cursor 130 across the interface 144 using the pointing device 114 in a predetermined and configurable manner to perfect the simulated "pinch to zoom-in," where an origin of the "zoom-in" is roughly identified or located at the "Four Corners" landmark. For example, as shown by a first plot 146 in FIG. 2, motion of the cursor 130 with respect to a 2-dimensional reference axis 148 of the interface 144 is generally towards an upper right portion of the interface 144, starting roughly from an initial position at the "Four Corners" landmark. In this example, the first plot 146 illustrates a variable A that indicates initial actuation of the input control 118 of the pointing device 114 to activate the ICE 116, and a variable B that indicates secondary actuation of the input control 118 of the pointing device 114 to deactivate the ICE 116, corresponding to termination of the "zoom-in." In this manner, the ICE 116 may simulate or emulate a multi-touch "pinch to zoom-in" input based on movement of the cursor 130 (i.e., movement of the pointing device 114), as discussed in further detail below.

In general, a "zoom factor" or a "magnitude" of the "zoom-in," may be proportional to a distance represented by a variable C within the interface 144. This distance may correspond to a distance that is traveled by the cursor 130 between the initial and the secondary actuation of the input control 118. For example, as shown in an idealized manner FIG. 2, the distance represented by the variable C may correspond to a "magnitude" of the "zoom-in" on the "Four Corners" landmark on the order of meters.

A similar process may be performed in a simulated multi-touch "spread to zoom-out" input in accordance with the present disclosure. For example, as shown by a second plot 150 in FIG. 2, and following initial actuation of the input control 118 of the pointing device 114, the user may move the cursor 130 across the interface 144 to a lower left portion within the interface 144 to perfect the simulated "spread to zoom-out," where an origin of the "zoom-out" is roughly identified or located at the "Four Corners" landmark. In general, motion of the cursor 130 with respect to the reference axis 148 to the lower left portion, or to the upper right portion described above, within the interface 144 does not have to be precise. For example, motion of the cursor 130 with respect to the reference axis 148 to the lower left portion within the interface 144 does not have to be at a predetermined angle with respect to one or more axes of the reference axis 148. Rather, the "spread to zoom-out" may be realized by general movement of the cursor 130 with respect to the reference axis 148 to the lower left portion within the interface 144, which is approximately opposite of movement of the cursor 130 across the interface 144 to emulate the "pinch to zoom-in." Other simulated touch "inputs" in accordance with the present disclosure may or may not follow such reciprocal or opposite movement in implementation.

Figure 3:
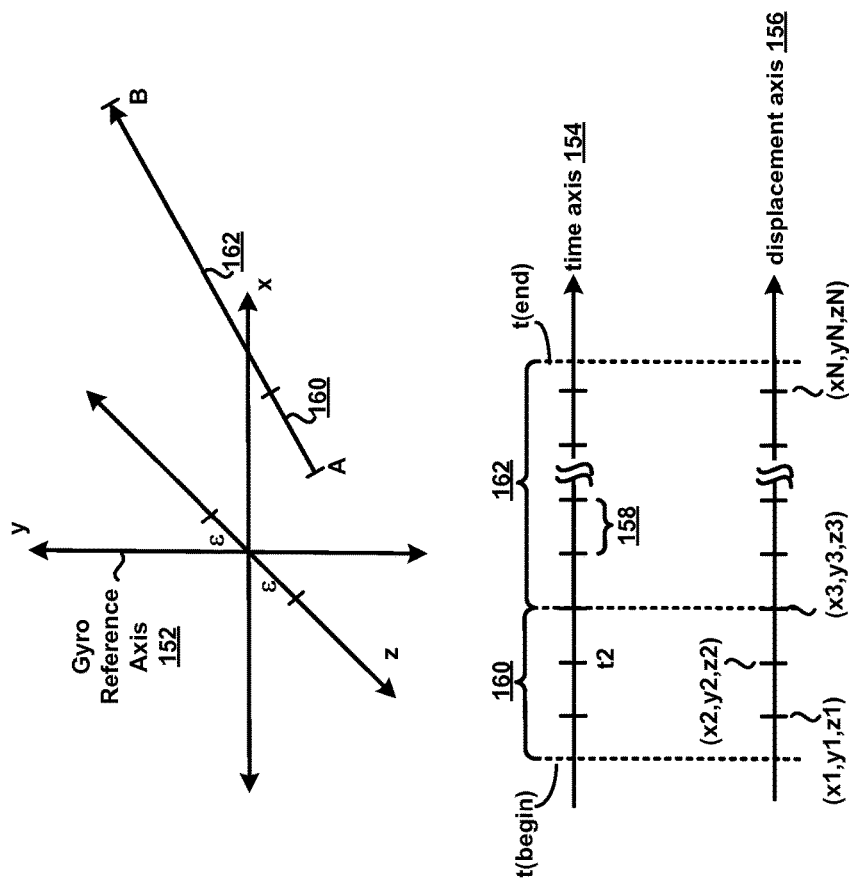
FIG. 3 shows movement of a pointing device of FIG. 1, to implement the simulated multi-touch input of FIG. 2, mapped to a particular reference coordinated system.

While the example first plot 146 and the example second plot 150 of FIG. 2 correlate motion of the cursor 130 with a simulated multi-touch "pinch to zoom" input, motion of the cursor 130 itself is a function of movement of the pointing device 114. Referring now to FIG. 3, movement of the pointing device 114 of FIG. 1 to implement the simulated multi-touch input of FIG. 2 is shown mapped to a particular reference coordinated system. In particular, FIG. 3 illustrates a 3-dimensional reference axis 152 of the gyroscope 120 of the pointing device 114 (see FIG. 1), along with a time axis 154 and a displacement axis 156. In this example, initial actuation of the input control 118 of the pointing device 114 to activate the ICE 116 may correspond to a time t(begin) marked on the time axis 154, and secondary actuation of the input control 118 of the pointing device 114 to deactivate the ICE 116 may correspond to a time t(end) marked on the time axis 154.

At a periodic interval 158 along the time axis 154 between time t(begin) and time t(end), the pointing device 114 may be configured to transmit an event message to the ICE 116 of the television receiver 110. In one embodiment, the periodic interval 158 may correspond to about 10 (ten) microseconds. However, other embodiments are possible, and a duration of the periodic interval 158 may or may not be implementation specific. In this example, each respective event message, corresponding to a particular "tick" on the time axis 154, may include displacement information of the pointing device 114 as measured with respect to the reference axis 152 by the gyroscope 120, along with an indication of a time corresponding to the displacement information. For example, an event message transmitted at a time t2 on the time axis 154 may at least include the information [x2, y2, z2, t2], where the component x2 may correspond to a relative position of the pointing device 114 along the x-axis of the reference axis 152 at time t2, the component y2 may correspond to a relative position of the pointing device 114 along the y-axis of the reference axis 152 at time t2, and the component z2 may correspond to a relative position of the pointing device 114 along the z-axis of the reference axis 152 at time t2.

Continuing with the above-mentioned example of a simulated multi-touch "pinch to zoom-in" input, the ICE 116 may be configured to implement and control the "zoom-in" based on information contained with event messages as received from the pointing device 114 between time t(begin) and time t(end). For example, the ICE 116 may be configured to identify, based on received event messages, displacement of the pointing device 114 from a first relative spatial position at time t(begin) to a second relative spatial position at time t(end). In this example, the second relative spatial position may generally exhibit "x" and "y" components greater or more positive in magnitude than "x" and "y" components of the first relative spatial position. This may, for example, be correlated to a user moving the pointing device 114 from an initial "lower left" orientation, such as the pointing device 114 being held in the user's right hand near the left leg, to a final "upper right" orientation, such as the pointing device 114 being held in the right user's hand with the arm held out straight from the body at shoulder lever, in a diagonal movement. Such an example displacement of the pointing device 114 is shown in FIG. 3.

Similar to that mentioned above in connection with FIG. 2, a "zoom factor" or a "magnitude" of the "zoom-in," may be proportional to a distance traveled by the pointing device 114 between the first and second relative spatial position. For example, and assuming a "z" component is approximately 0 (zero), the ICE 116 may derive relative displacement of the pointing device 114 between the first and second relative spatial position by performing a component-by-component operation of the form: [xN, yN, 0, tN]−[x1, y1, 0, t1], where N is a non-zero integer value greater than 1 (one). In this example, the temporal component [tN−t1] may be used in combination with the displacement component [xN−x0, yN−y0] to determine a velocity or average velocity of movement between the first and second relative spatial position. In turn, this velocity may be used by the ICE 116 to control a "speed" at which the "zoom-in" is performed during the "pinch to zoom-in" as emulated by the ICE 116, based on the linear relationship between distance and velocity and time. For example, a "speed" at which the "zoom-in" to the "Four Corners" landmark in FIG. 2 is perceived by a user may be dependent on how fast the user moves pointing device 114 over the distance represented by the variable C.

As shown in FIG. 3, the time axis 154 and the displacement axis 156 may be partitioned into a first interval 160 and a second interval 162. In this example, the ICE 116 may calculate, based on information contained within event messages as received within the first interval 160, user intention as to a "type" of touch input to emulate. For example, the ICE 116 may calculate distance and direction traveled by the pointing device 114 over the first interval 160 by performing a component-by-component operation of the form: [x3, y3, z3, t3]−[x1, y1, z1, t1]. In this example, duration or length of the first interval 160 may be configurable, and assuming both components [x3−x1] and [y3−y1] are positive or greater than 0 (zero), and the component [z3-z1] is evaluated as approximately or about 0 (zero) within a predetermined and configurable error margin E (see reference axis 152), the ICE 116 may determine or estimate that movement of the pointing device 114 is approximately between or from the initial "lower left" orientation to the final "upper right" orientation as discussed above. Here, the ICE 116 may map such a movement to the example "pinch to zoom-in" input, thus estimating or determining user intention as to a "type" of touch input to implement. Subsequently, information contained within event messages as received within the first interval 160, combined with information contained within event messages as received within the second interval 162, may be used by the ICE 116 to control the "zoom-in" of the simulated "pinch to zoom-in" in a manner as described above.

Figure 4:
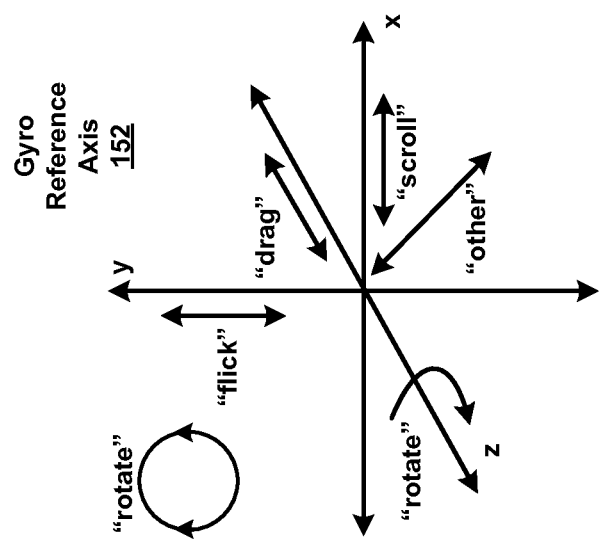
FIG. 4 shows a mapping of multiple touch or multi-touch inputs in relation to the particular reference coordinated system of FIG. 3.

In general, it is contemplated that the ICE 116 may be configured to emulate any type of touch or multi-touch input in accordance with the present disclosure. For example, referring now to FIG. 4, a mapping of multiple touch or multi-touch inputs in relation to the particular reference coordinated system of FIG. 3 is shown. In particular, FIG. 4 shows a mapping of multiple touch or multi-touch inputs in relation to the reference axis 152 of the gyroscope 120 of FIG. 1. In the example of FIG. 4, it is contemplated that any particular simulated touch or multi-touch input may be mapped to any individual, or any particular combination, of the x-axis and y-axis and z-axis of the reference axis 152. In other words, the mapping may be predetermined and configurable, there is no requirement that maps a particular gesture to a particular movement. In this manner, these and other types of inputs may be simulated or emulated in a manner similar to that described above in connection with FIGS. 1-3.

For example, FIG. 4 shows an example "scroll" touch input mapped to the x-axis of the reference axis 152. In this example, the ICE 116 may be configured to identify movement of the pointing device 114 in a horizontal direction, and emulate a "scroll" touch input based on information received within respective event messages during movement or displacement of the pointing device 114. This may, for example, be correlated to a user moving the pointing device 114 from an initial "left" position or orientation, such as the pointing device 114 being held in the user's right hand with the arm held out across the body at left shoulder level, to a final "right" position or orientation, such as the pointing device 114 being held in the user's right hand with the arm held out straight from the body at right shoulder level, in a horizontal movement. Other embodiments are possible.

FIG. 4 further shows an example "flick" touch input mapped to the y-axis of the reference axis 152. In this example, the ICE 116 may be configured to identify movement of the pointing device 114 in a vertical direction, and emulate a "flick" touch input based on information received within respective event messages during movement or displacement of the pointing device 114. This may, for example, be correlated to a user moving the pointing device 114 from an initial "up" position or orientation, such as the pointing device 114 being held in the user's right hand with the arm held out straight at right shoulder level, to a final "down" position or orientation, such as the pointing device 114 being held in the user's right hand with the arm held out at right leg level, in a vertical movement. Other embodiments are possible.

FIG. 4 further shows an example "drag" touch input mapped to the z-axis of the reference axis 152. In this example, the ICE 116 may be configured to identify movement of the pointing device 114 in a forward or backward direction, and emulate a "drag" touch input based on information received within respective event messages during displacement of the pointing device 114. This may, for example, be correlated to a user moving the pointing device 114 from an initial "forward" position or orientation, such as the pointing device 114 being held in the user's right hand with the arm held out from the body at right shoulder level, to a final "backward" position or orientation, such as the pointing device 114 being held in the user's right hand near the chest at right shoulder lever, in a "backward" or "reverse" movement. Other embodiments are possible.

Many other types of touch inputs may be mapped to the reference axis 152 as well. For example, FIG. 4 further shows an example "other" touch input mapped to the x-axis and y-axis of the reference axis 152. In this example, the ICE 116 may be configured to identify movement of the pointing device 114 in an approximate diagonal direction, and emulate an "other" touch input based on information received within respective event messages during displacement of the pointing device 114. This may, for example, be correlated to a user moving the pointing device 114 from an initial "upper right" position or orientation, such as the pointing device 114 held in the user's right hand with the arm held out across the body at left shoulder level, to a final "lower right" position or orientation, such as the pointing device 114 being held in the user's right hand near the right leg, in a diagonal movement. The "other" touch input is intended to represent "other" types of touch inputs not expressly shown in FIG. 4. Other embodiments are possible.

FIG. 4 further shows an example "rotate" touch input mapped to the x-axis and y-axis of the reference axis 152. In this example, the ICE 116 may be configured to identify circular movement of the pointing device 114, and emulate a "rotate clockwise" or "rotate counter clockwise" touch input based on information received within respective event messages during displacement of the pointing device 114. This may, for example, be correlated to a user moving the pointing device 114 from an initial "stationary" position or orientation, such as the pointing device 114 being held in the user's right hand with the arm held out straight from the body at right shoulder level, back to the initial "stationary" position or orientation in a "circular" movement, such as by inscribing an imaginary letter "O" in space using the pointing device 114. Other embodiments are possible.

In an alternative implementation, FIG. 4 further shows an example "rotate" touch input mapped to the z-axis of the reference axis 152. In this example, the ICE 116 may be configured to identify rotational movement of the pointing device 114, and emulate a "rotate clockwise" or "rotate counter clockwise" touch input based on information received within respective event messages during displacement of the pointing device 114. This may, for example, be correlated to a user moving the pointing device 114 from an initial "stationary" position or orientation, such as the pointing device 114 being held in the user's right hand with the arm held out straight from the body at right shoulder level, to a secondary "stationary" position or orientation, such as by rotating the pointing device 114 by rotation of the wrist. Other embodiments are possible.

Figure 5:
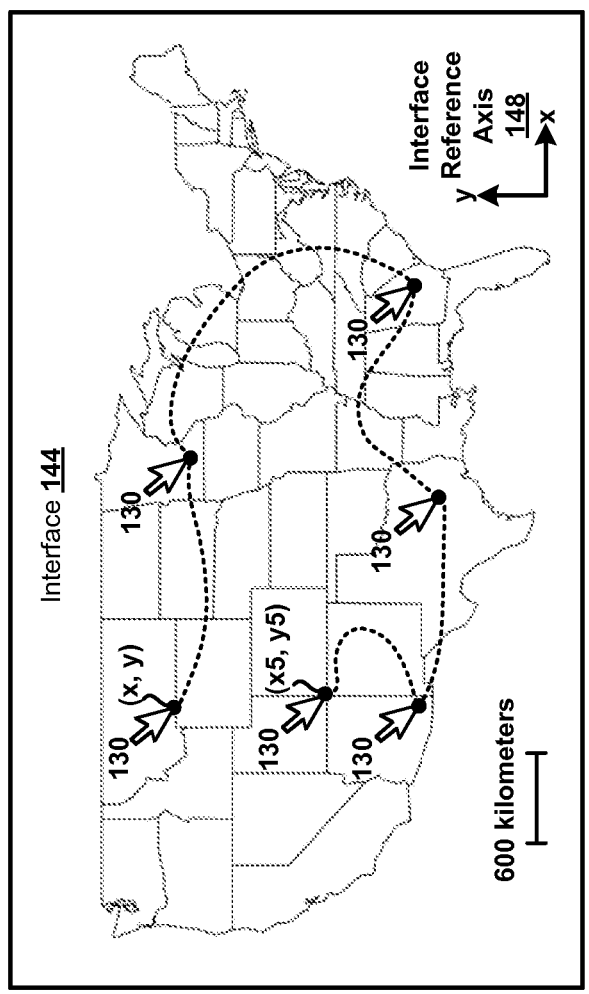
FIG. 5 shows example movement of a cursor with an interface of FIG. 1.

Referring now to the FIG. 5, example movement of the cursor 130 with the interface 144 of FIG. 1 is shown. Here, the ICE 116 may track movement of the cursor 130 to determine or identify, for example, the "Four Corners" landmark as the origin of the simulated "pinch to zoom" as described above at least in connection with FIG. 2. In particular, at an initial point in time, such as when the interface 144 is initially rendered for example, the television receiver 110 or the ICE 116 may render the cursor 130 within the interface 144 at an arbitrary initial coordinate (x, y), with reference to the reference axis 148. The television receiver 110 or the ICE 116 may then track periodically or at least intermittently relative displacement of the cursor 130 within the interface 144 in time. For example, at a time t1, a "tip" of the cursor may be determined to point to, approximately and depending on resolution of the interface 144, coordinate (x1, y1). At a time t2, the "tip" of the cursor may be determined to point to coordinate (x2, y2). At a time t3, the "tip" of the cursor may be determined to point to coordinate (x3, y3). At a time t4, the "tip" of the cursor may be determined to point to coordinate (x4, y4). Finally, at a time t5, corresponding to initial actuation of the input control 118 of the pointing device 114 as described above, the "tip" of the cursor may be determined to point to coordinate (x5, y5). Accordingly, the ICE 116 may emulate the "pinch to zoom-out" in a manner such as described above using the coordinate (x5, y5), which may be matched to the "Four Corners" landmark within the image as displayed within the interface 144, as an origin of the "zoom-out." Other embodiments are possible.

Figure 6:
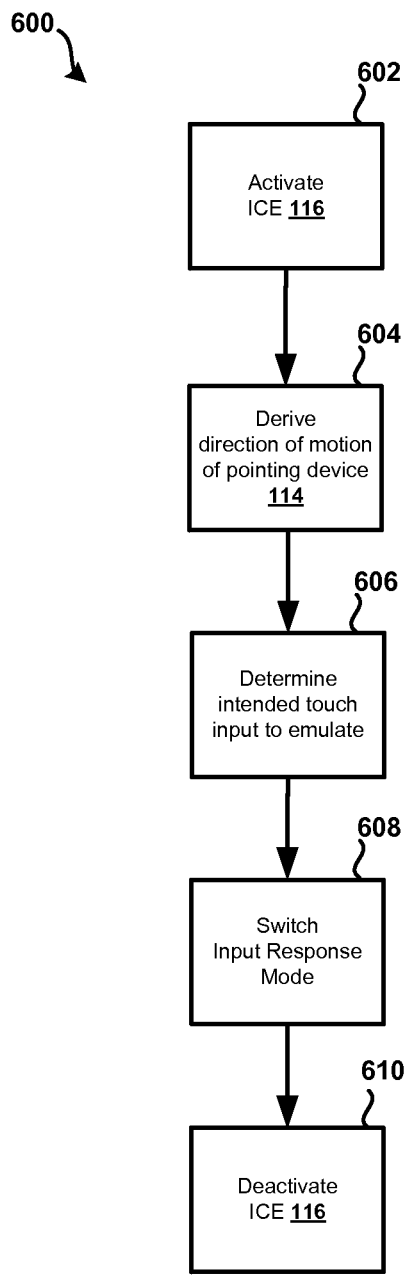
FIG. 6 shows an example method for switching a user interface input response mode.

Referring now to FIG. 6, an example method 600 for switching a user interface input response mode is shown in accordance with the principles of the present disclosure. The method 600 is described as implemented by or on the television receiver 110 of FIG. 1. Other embodiments are however possible. For example, one or more modules or steps of the example method 600 may be implemented by one or more of the other respective devices or components within the example system 100 of FIG. 1 as described above.

The method 600 may include receiving (module 602), by the television receiver 110 from the pointing device 114, a control signal to activate the ICE 116. In this example, activation of the ICE 116 may correspond to enabling the ICE 116 to simulate or emulate a touch input based on movement of the pointing device 114 in accordance with the present disclosure.

The method 600 may further include determining (module 604), by the ICE 116 of the television receiver 110, a direction of motion of the pointing device 114 with reference to the reference axis 152 of the gyroscope 120 of the pointing device 114. For example, the ICE 116 may derive at least a direction of motion of the pointing device 114 over the first interval 160 (see FIG. 3) based on an output of the gyroscope 120 over the first interval 160. For example, the ICE 116 may extract information contained within event messages as received within the first interval 160, and perform a component-by-component vector-type operation of the form: [xM, yM, zM, tM]−[x1, y1, z1, t1], where M is a non-zero integer value greater than integer value 1 (one), to derive at least a direction of motion of the pointing device 114 over the first interval 160.

The method 600 may further include associating (module 606), by the ICE 116 of the television receiver 110, the direction of motion of the pointing device 114 with a particular touch input to be simulated by the ICE 116 based on the motion of the pointing device 114. For example, the ICE 116 may map the direction of motion of the pointing device 114 to one or more particular axes of the reference axis 152 of the gyroscope 120. For example, based on a result of the above component-by-component vector-type operation, the ICE 116 may map a "diagonal" direction of motion of the pointing device 114 to the x-axis and y-axis of the reference axis 152, and associate the "diagonal" direction of motion along the x-axis and y-axis with a "pinch to zoom-in" or a "pinch to zoom-out" input. In this example, the ICE 116 may determine, based on information contained within event messages as received within the first interval 160, user intention as to a "type" of touch input to emulate.

The method 600 may further include switching (module 608), by the ICE 116 of the television receiver 110, the user interface input response mode of the interface 144 from a "single-point" input response mode such as, for example, a mode responsive to one or more discrete "point and click" actions to be implemented using the pointing device 114, to a "simulated" input response mode that enables a user to implement the above-mentioned particular touch input to be simulated using the pointing device 114.

The method 600 may further include receiving (module 610), by the television receiver 110 from the pointing device 114, a control signal to deactivate the ICE 116. In this example, deactivation of the ICE 116 may correspond to disabling the ICE 116 to simulate or emulate a touch input based on movement of the pointing device 114 in accordance with the present disclosure. In one example, in response to the disabling, the ICE 116 may switch the user interface input response mode of the interface 144 from the "simulated" input response mode back to the "single-point" input response mode. Other embodiments are possible.

Figure 7:
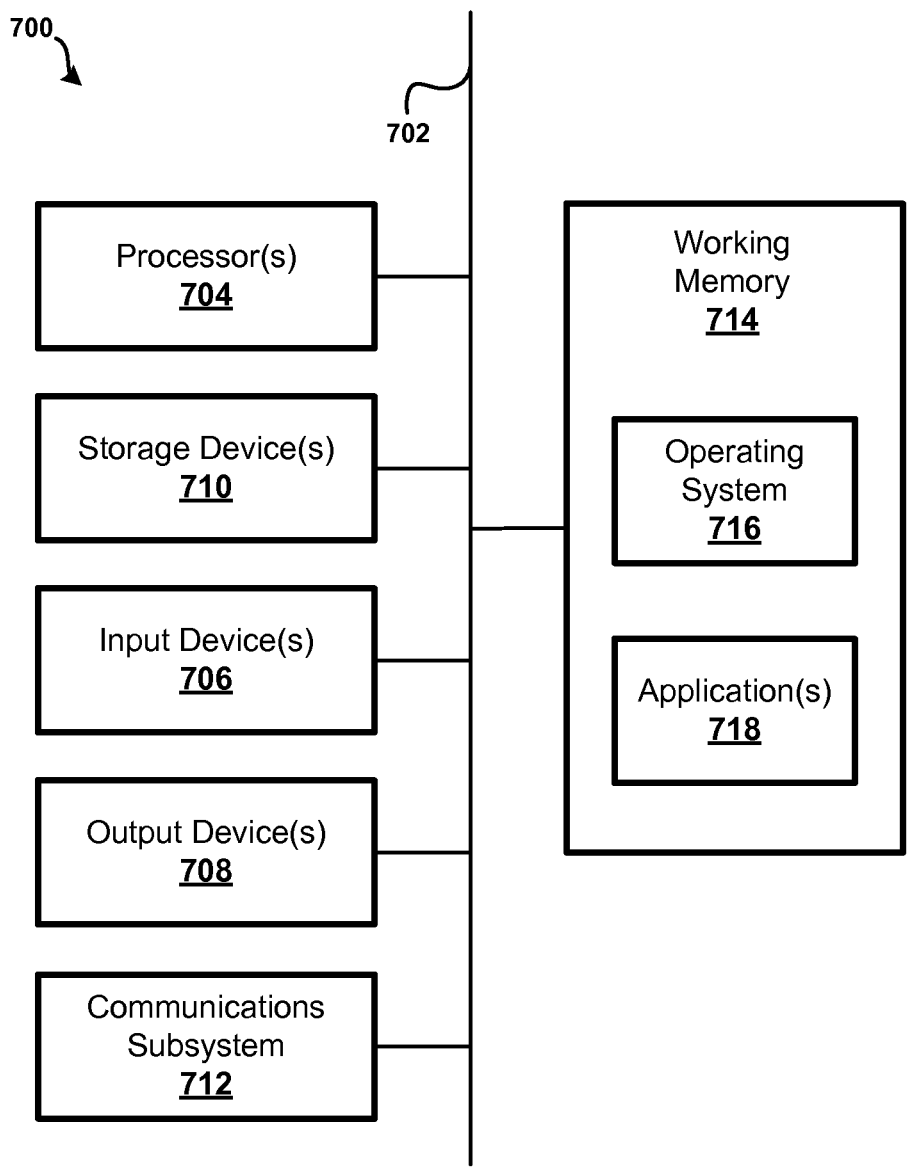
FIG. 7 shows an example computing system or device.

Referring now to FIG. 7, an embodiment of an example computer system or device 700 is shown. An example of a computer system or device includes an enterprise server, blade server, desktop computer, laptop computer, personal data assistant, smartphone, gaming console, set-top-box, and any other type machine for performing calculations. The computer system 700 may be wholly or at least partially incorporated as part of previously-described computing devices, such as at least the television receiver 110, the television 112, and the pointing device 114 of FIG. 1. The example computer device 700 may be configured to perform and/or include instructions that, when executed, cause the computer system 700 to perform the method of FIG. 6. FIG. 7 is intended only to provide a generalized illustration of various components, any or all of which may be utilized as appropriate. FIG. 7, therefore, broadly illustrates how individual system elements may be implemented in a relatively separated or relatively more integrated manner.

The computer device 700 is shown comprising hardware elements that can be electrically coupled via a bus 702 (or may otherwise be in communication, as appropriate). The hardware elements may include a processing unit with one or more processors 704, including without limitation one or more general-purpose processors and/or one or more special-purpose processors (such as digital signal processing chips, graphics acceleration processors, and/or the like); one or more input devices 706, which can include without limitation a remote control, a mouse, a keyboard, and/or the like; and one or more output devices 708, which can include without limitation a presentation device (e.g., television), a printer, and/or the like.

The computer system 700 may further include (and/or be in communication with) one or more non-transitory storage devices 710, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer device 700 might also include a communications subsystem 712, which can include without limitation a modem, a network card (wireless or wired), an infrared communication device, a wireless communication device, and/or a chipset (such as a Bluetooth™ device, an 802.11 device, a WiFi device, a WiMax device, cellular communication facilities (e.g., GSM, WCDMA, LTE, etc.), and/or the like. The communications subsystem 712 may permit data to be exchanged with a network (such as the network described below, to name one example), other computer systems, and/or any other devices described herein. In many embodiments, the computer system 700 will further comprise a working memory 714, which can include a RAM or ROM device, as described above.

The computer device 700 also can comprise software elements, shown as being currently located within the working memory 714, including an operating system 716, device drivers, executable libraries, and/or other code, such as one or more application programs 718, which may comprise computer programs provided by various embodiments, and/or may be designed to implement methods, and/or configure systems, provided by other embodiments, as described herein. Merely by way of example, one or more procedures described with respect to the method(s) discussed above, and/or system components might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 710 described above. In some cases, the storage medium might be incorporated within a computer system, such as computer system 700. In other embodiments, the storage medium might be separate from a computer system (e.g., a removable medium, such as flash memory), and/or provided in an installation package, such that the storage medium can be used to program, configure, and/or adapt a general purpose computer with the instructions/code stored thereon. These instructions might take the form of executable code, which is executable by the computer device 700 and/or might take the form of source and/or installable code, which, upon compilation and/or installation on the computer system 700 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer device 700) to perform methods in accordance with various embodiments of the invention. According to a set of embodiments, some or all of the procedures of such methods are performed by the computer system 700 in response to processor 704 executing one or more sequences of one or more instructions (which might be incorporated into the operating system 716 and/or other code, such as an application program 718) contained in the working memory 714. Such instructions may be read into the working memory 714 from another computer-readable medium, such as one or more of the storage device(s) 710. Merely by way of example, execution of the sequences of instructions contained in the working memory 714 may cause the processor(s) 704 to perform one or more procedures of the methods described herein.

The terms "machine-readable medium" and "computer-readable medium," as used herein, refer to any medium that participates in providing data that causes a machine to operate in a specific fashion. In an embodiment implemented using the computer device 700, various computer-readable media might be involved in providing instructions/code to processor(s) 704 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 710. Volatile media include, without limitation, dynamic memory, such as the working memory 714.

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 704 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700.

The communications subsystem 712 (and/or components thereof) generally will receive signals, and the bus 702 then might carry the signals (and/or the data, instructions, etc. carried by the signals) to the working memory 714, from which the processor(s) 704 retrieves and executes the instructions. The instructions received by the working memory 714 may optionally be stored on a non-transitory storage device 710 either before or after execution by the processor(s) 704.

The methods, systems, and devices discussed above are examples. Various configurations may omit, substitute, or add various method steps or procedures, or system components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Furthermore, the example embodiments described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for controlling display of an on-screen image using a simulated multi-touch input, comprising:
   detecting a first discrete action corresponding to a first actuation of a pointing device;
   determining a first time and a first position, on a two-dimensional display interface, associated with the first discrete pointing device actuation;
   detecting a second discrete action corresponding to a second actuation of the pointing device;

determining a second time and a second position, on the two-dimensional display interface, associated with the second discrete pointing device actuation;

determining a direction of motion within the two-dimensional display interface from the first discrete pointing device actuation to the second discrete pointing device actuation, based on the first position on the two-dimensional display interface associated with the first discrete pointing device actuation and the second position on the two-dimensional display interface associated with the second discrete pointing device actuation;

determining a particular type of multi-touch input, based on the determined direction of motion within the two-dimensional display interface from the first discrete pointing device actuation to the second discrete pointing device actuation, using a predetermined mapping of a plurality of directions of motion within the two-dimensional display interface to a corresponding plurality of multi-touch input types; and controlling display of an on-screen image in accordance with the particular multi-touch input.

2. The method of claim 1, further comprising:
mapping the direction of motion to a particular axis within the two-dimensional display interface; and
determining the particular multi-touch input based on the mapping.

3. The method of claim 1, further comprising:
mapping the direction of motion to at least two axes of the two-dimensional display interface; and
determining the particular multi-touch input based on the mapping.

4. The method of claim 1, further comprising tracking the direction of motion within the two-dimensional display interface from the first discrete pointing device actuation to the second discrete pointing device actuation in response to receiving a particular signal that enables the tracking.

5. The method of claim 4, further comprising controlling the display of the on-screen image in accordance with the particular multi-touch input, in response to a particular signal that disables the tracking.

6. A television receiver, comprising:
a first module configured to receive from a pointing device a first signal that activates a simulated touch input mode;
a second module configured to receive from the pointing device a second signal that indicates a direction of motion within a two-dimensional display interface between a first discrete actuation of the pointing device and a second discrete actuation of the pointing device, based on a first position on the two-dimensional display interface associated with the first discrete actuation and a second position on the two-dimensional display interface associated with the second discrete actuation;
a third module configured to determine a particular type of multi-touch input from a plurality of multi-touch inputs, based on the received direction of motion within the two-dimensional display interface from the first discrete actuation to the second discrete actuation of the pointing device, using a predetermined mapping of a plurality of directions of motion within the two-dimensional display interface to a corresponding plurality of multi-touch input types; and
a fourth module configured to select the particular multi-touch input to control display of an image within the two-dimensional display interface on a display device using the pointing device.

7. The method of claim 6, further comprising a module configured to set an image control origin in reference to a planar coordinate system associated with the image in response to receiving the first signal.

8. The television receiver of claim 7, further comprising a module configured to control display of the image according to the particular multi-touch input, with reference to the image control origin, based on direction of motion within the two-dimensional display interface from the first discrete pointing device actuation to the second discrete pointing device actuation.

9. The television receiver of claim 6, wherein the direction of motion within the two-dimensional display interface from the first discrete pointing device actuation to the second discrete pointing device actuation comprises at least one of an angular direction of motion, a direction of motion along a first axis, and a direction of motion along a second axis in reference to a two-dimensional coordinate system.

10. A computing device, comprising:
a processing unit; and
a system memory connected to the processing unit, the system memory including instructions that, when executed by the processing unit, cause the processing unit to implement at least one module to switch a user interface input response mode, the at least one module configured to:
detect a first discrete action corresponding to a first actuation of a pointing device;
determine a first time and a first position, on a two-dimensional display interface, associated with the first discrete pointing device actuation;
detect a second discrete action corresponding to a second actuation of the pointing device;
determine a second time and a second position, on the two-dimensional display interface, associated with the second discrete pointing device actuation;
determine a direction of motion within the two-dimensional display interface from the first discrete pointing device actuation to the second discrete pointing device actuation, based on the first position on the two-dimensional display interface associated with the first discrete pointing device actuation and the second position on the two-dimensional display interface associated with the second discrete pointing device actuation;
determine a particular type of multi-touch input, based on the determined direction of motion within the two-dimensional display interface from the first discrete pointing device actuation to the second discrete pointing device actuation, using a predetermined mapping of a plurality of directions of motion within the two-dimensional display interface to a corresponding plurality of multi-touch input types; and
control display of an on-screen image in accordance with the particular multi-touch input.

11. The computing device of claim 10, wherein the at least one module is further configured to map the direction of motion to a particular axis within the two-dimensional display interface, and determining the particular multi-touch input based on the mapping.

12. The computing device of claim 10, wherein the at least one module is further configured to map the direction of motion to at least two axes within the two-dimensional display interface, and determining the particular multi-touch select the particular touch input for the switch based on the mapping.

13. The computing device of claim 10, wherein the at least one module is further configured to track the direction of motion within the two-dimensional display interface from the first discrete pointing device actuation to the second discrete pointing device actuation in response to receiving a particular signal that enables tracking.

14. The computing device of claim 10, wherein the at least one module is further configured to set an image control origin in reference to a planar coordinate system associated with the image, and control display of an image according to the particular simulated touch input, with reference to the image control origin, based on motion within the two-dimensional display interface from the first discrete pointing device actuation to the second discrete pointing device actuation.

15. The method of claim 1, wherein determining the particular multi-touch input from the plurality of multi-touch inputs, based on the direction of motion within the two-dimensional display interface from the first discrete pointing device actuation to the second discrete pointing device actuation, comprises:
   comparing the direction of motion to a directional range within the two-dimensional display interface corresponding to a pinch-to-zoom input mode; and
   based on a determination that the direction of motion is within the directional range corresponding to a pinch-to-zoom-in input mode in the predetermined mapping of multi-touch input types, determining the pinch-to-zoom-in input mode for controlling display of the on-screen image.

16. The method of claim 1, wherein determining the particular type of multi-touch input, based on the direction of motion within the two-dimensional display interface from the first discrete pointing device actuation to the second discrete pointing device actuation, comprises:
   within the predetermined mapping of multi-touch input types, comparing the direction of motion within the two-dimensional display interface to a directional range corresponding to a spread-to-zoom-out input mode; and
   based on a determination that the direction of motion within the two-dimensional display interface is within the directional range corresponding to the spread-to-zoom-out input mode in the predetermined mapping of multi-touch input types, determining the spread-to-zoom-out input mode for controlling display of the on-screen image.

17. The method of claim 1, further comprising:
   determining a distance traveled by the pointing device within the two-dimensional display interface, based on the first position and the second position; and
   determining a magnitude factor for controlling display of the on-screen image in accordance with the particular multi-touch input, wherein the determined magnitude factor is proportional to the distance traveled within the two-dimensional display interface.

18. The method of claim 1, wherein the predetermined mapping of multi-touch input types includes a mapping of a first direction of motion within the two-dimensional display interface to a first type of multi-touch input, and a mapping of a second direction of motion within the two-dimensional display interface to a second type of multi-touch input.

19. The method of claim 1, wherein determining the particular type of multi-touch input, based on the direction of motion within the two-dimensional display interface from the first discrete pointing device actuation to the second discrete pointing device actuation, comprises:
   determining the direction of motion with respect to a reference axis within the interface; and
   determining a pinch-to-zoom-in input mode for controlling display of the on-screen image, based on the determined direction of motion with respect to the reference axis within the interface.

20. The method of claim 19, further comprising:
   determining an updated direction of motion within the two-dimensional display interface from the first discrete pointing device actuation to the second discrete pointing device actuation within the two-dimensional display interface, based on a third position associated with a third discrete pointing device actuation and a fourth position associated with a fourth discrete pointing device actuation; and
   determining an updated particular type of multi-touch input, based on the updated direction of motion within the two-dimensional display interface, using the predetermined mapping of multi-touch input types to the corresponding directions of motion within the two-dimensional display interface, wherein determining the updated particular type of multi-touch input comprises:
      determining the updated direction of motion of the pointing device with respect to the reference axis within the interface; and
      determining a spread-to-zoom-out input mode for controlling display of the on-screen image, based on the determined updated direction of motion with respect to the reference axis within the interface.

* * * * *